Sept. 4, 1928.

C. RETSCHY

OIL FEEDING DEVICE

Filed Jan. 16, 1926

1,682,853

INVENTOR

Patented Sept. 4, 1928.

1,682,853

UNITED STATES PATENT OFFICE.

CURT RETSCHY, OF DESSAU, GERMANY, ASSIGNOR TO HUGO JUNKERS, OF DESSAU, GERMANY.

OIL-FEEDING DEVICE.

Application filed January 16, 1926, Serial No. 81,802, and in Germany January 24, 1925.

My invention relates to means for feeding oil through bearing surfaces into the interior of rotating shafts whence it is led to the places of consumption as for instance to the crank pin bearings of a crank shaft, these means being especially suited for such shafts which have main bearings of comparatively great diameters, as it will be the case for instance with crank shafts being supported with its circularly shaped crank webs in journal bearings.

The sufficient feeding of the crank pins with oil through such circular crank webs is difficult on account of the fact, that in consequence of the great diameter of such crank web journals the circumferential speed and therefore the centrifugal forces are greater than in normal journals of such crank shafts.

Accordingly, the object of my invention is to obtain good conditions for the introduction of the oil into such journals of great diameter and to counteract centrifugal forces.

In the accompanying drawing, forming part of this specification, an example of the preferred embodiment of my invention is illustrated.

Figure 1:
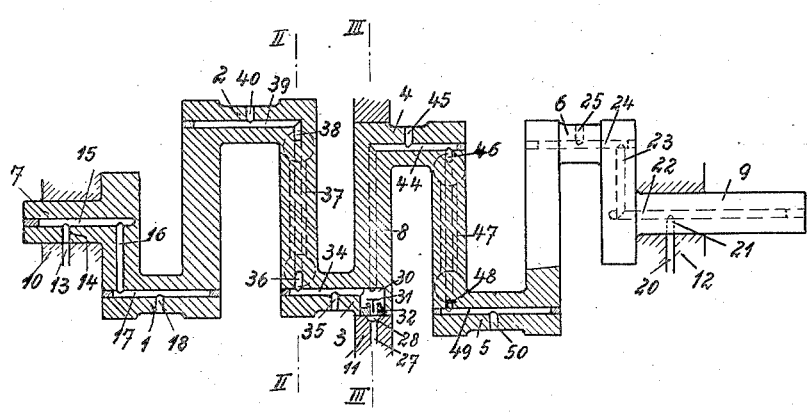
Fig. 1 shows a longitudinal section of a crank shaft for a twin-double piston engine, the middle main journal thereof being formed by the circular crank web and supplied with an oil feeding device according to the invention.
Figure 2:
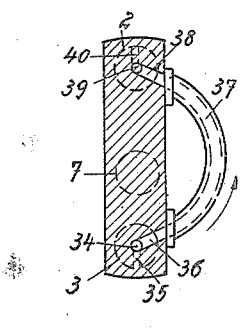
Fig. 2 shows a transverse section through a side web of this crank shaft, indicated by the line II—II in Fig. 1.
Figure 3:
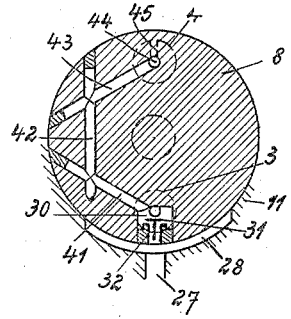
Fig. 3 shows a transverse section through the middle web, indicated by the line III—III in Fig. 1.

Referring now to the drawing which is largely schematic in character, the crank shaft illustrated therein has six pins, numbered 1 to 6 inclusive, to which the ends of a like number of connecting rods are to be connected, said shaft being supported with its three journals 7, 8, 9, the two outer 7 and 9 of which are of normal shape, while the middle one 8 is of a comparatively great diameter on account of the fact, that it is formed by the circularly shaped crank web 8 connncting the crank pins 3 and 4. The journals 7 to 9 are supported in the main bearings 10, 11 and 12 respectively.

The oil feeding of the two outer pins 1 and 6 is effected in the known manner by means of channels 13, 20 in the main bearings 10, 12, receiving oil under pressure and coming into communication during the rotation of the crank shaft with the branch channels 14, 21, in the journals 7 and 9, these branches leading to a conduit of borings 15 to 18 and 22 to 25 respectively, each conduit ending in the outer surface of one of the pins 1 and 6.

The oil feeding of the other pins 2 to 5 inclusive is attained by means of a channel 27 in the middle main bearing 11, supplied with oil under pressure and communicating during the rotation of the crank shaft for a time with a hollow space or recess 30 in the outer portion of the crank web 8. From this space a conduit formed of borings 34, 35 leads to the outer surface of the adjacent pin 3 and from there through boring 36, bow-channel 37, and borings 38, 39, 40 to the outer surface of the pin 2. Another conduit formed by polygonally arranged channels 41 to 43 in the crank web 8, borings 44 to 46, 48 to 50 and bow-channel 47 leads the oil to the outer surfaces of the pins 4 and 5.

The bow-channels 37, 47 and the semi-circular channels 41, 42, 43 are provided in order to avoid so far as possible losses in the centrifugal forces produced in the oil introduced into these channels, since such losses would cause a diminution of the pressure under which the oil stands, and therefore the places which are beyond such points where the pressure is diminished would not receive enough oil, whilst in the places before these points a superfluity of oil would arise.

In order to secure a sufficient time for the overflow of oil from the channel 11 in the hollow space 30, in considering the high circumferential speed of the journal 8, a groove 28 extending in the direction of rotation is provided in the gliding surface of the bearing 11, which makes possible the overflow of the oil during the whole time the engine needs for running through the angle over which the groove 28 extends. Obviously the groove 28 could also be arranged in the outer surface of the journal 8 instead of in the bearing 11, or in both parts.

For effectively preventing the oil entered into the space 30 from running out again if the crank shaft is turning further a non-return valve 31 cooperating with the valve seat 32 may be inserted at the entrance of the space 30, preferably in such a manner, that its own centrifugal force has the tendency to close it.

By these means a sufficient and effective lubrication of the pins 2 to 5 is obtained in spite of the existing unfavorable circumstances.

It may be understood, that the sphere of this invention is not limited to this specific example of execution which I have selected for describing and illustrating my invention, but it embraces all variations and modifications thereof which are within the scope of the concluding claims and which will be obvious to those skilled in the art to which my invention relates.

What I claim is:

1. In a device for leading oil to the interior of rotating shafts in combination: a main shaft bearing, a shaft supported therein with its journal, a conduit in said bearing for supplying oil under pressure to the gliding surface of said journal, a second conduit in the journal communicating with said first conduit and leading to the place of oil consumption and a nonreturn valve in the entrance of said second conduit, adapted to hold back the oil entered against being repelled by centrifugal forces.

2. In a device for leading oil to the interior of rotating shafts in combination: a main shaft bearing, a shaft supported therein with its journal, a conduit in said bearing for supplying oil under pressure to the gliding surface of said journal, a second conduit in the journal communicating with said first conduit and leading to the place of oil consumption, and a nonreturn valve in the entrance of said second conduit, adapted to hold back the oil entered into the recess against being repelled by centrifugal forces and inserted in an essentially radial passage so as to close by its own centrifugal force.

3. In a device for leading oil to the interior of rotating shafts in combination: a main shaft bearing, a shaft supported therein with its journal, a conduit in said bearing for supplying oil under pressure to the gliding surface, of said journal, a groove communicating with said conduit and extending in either of said gliding surfaces in the direction of its circumference, a second conduit in the journal communicating with said groove and leading to the place of oil consumption and a nonreturn valve in the entrance of said second conduit, adapted to hold back the oil entered into the recess against being repelled by centrifugal forces.

4. In a crank shaft oiling device in combination: a crank web so shaped as to form a journal of comparatively great diameter, a main bearing supporting said journal, a conduit in said bearing for supplying oil under pressure to the gliding surfaces of said journal, a second conduit in the journal communicating with said first conduit and leading to the place of oil consumption and a nonreturn valve in the entrance of said second conduit, adapted to hold back the oil entered against being repelled by centrifugal forces.

5. In a crank shaft oiling device in combination: a crank web so shaped as to form a journal of comparatively great diameter, a main bearing supporting said journal, a conduit in said bearing for supplying oil under pressure to the gliding surfaces of said journal, a groove communicating with said conduit and extending in either of said gliding surfaces in the direction of its circumference, a second conduit in the journal communicating with said groove and leading to the place of oil consumption and a nonreturn valve in the entrance of said second conduit, adapted to hold back the oil entered into the recess against being repelled by centrifugal forces.

In testimony whereof I affix my signature.

CURT RETSCHY.